(12) United States Patent
Imamura

(10) Patent No.: US 11,880,631 B2
(45) Date of Patent: Jan. 23, 2024

(54) PROCESSING APPARATUS AND IMMERSION LEVEL DERIVING METHOD

(71) Applicant: Sony Interactive Entertainment Inc., Tokyo (JP)

(72) Inventor: Takashi Imamura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/355,317

(22) Filed: Jun. 23, 2021

(65) Prior Publication Data

US 2022/0012006 A1 Jan. 13, 2022

(30) Foreign Application Priority Data

Jul. 9, 2020 (JP) ................................ 2020-118638

(51) Int. Cl.
*G06F 3/16* (2006.01)
(52) U.S. Cl.
CPC ...................................... *G06F 3/16* (2013.01)
(58) Field of Classification Search
CPC .... G06F 3/048; G06F 3/0481; G06F 3/04817; G06F 3/0482; G06F 3/011–013; G06F 3/16; H04N 21/44213–44222
See application file for complete search history.

(56) References Cited

U.S. PATENT DOCUMENTS

| 2014/0157294 | A1* | 6/2014 | Chung | H04N 21/25891 |
| | | | | 725/10 |
| 2015/0339539 | A1* | 11/2015 | Gu | G06V 10/40 |
| | | | | 382/190 |
| 2018/0321798 | A1 | 11/2018 | Kawamura | |
| 2020/0166996 | A1* | 5/2020 | Seo | G06V 40/174 |
| 2021/0060429 | A1* | 3/2021 | Juenger | G06F 3/0482 |
| 2021/0289068 | A1* | 9/2021 | Hosoda | G06F 3/16 |

FOREIGN PATENT DOCUMENTS

JP 2017117008 A 6/2017

* cited by examiner

*Primary Examiner* — Priyank J Shah
(74) *Attorney, Agent, or Firm* — Matthew B. Dernier, Esq.

(57) ABSTRACT

Provided is a processing apparatus for deriving a level of immersion in content includes a state data acquisition part configured to acquire state data including data indicating a user's first reaction and data indicating a user's second reaction during image display of the content, a first analysis part configured to analyze the data indicative of the first reaction to derive a first immersion evaluation value based on the user's first reaction, a second analysis part configured to analyze the data indicative of the second reaction to derive a second immersion evaluation value based on the user's second reaction, a weight setting part configured to set a weight value for each of the first and second immersion evaluation values, and an immersion level deriving part configured to derive the level of immersion in the content from the first and second immersion evaluation values and from the respective weight values thereof.

10 Claims, 6 Drawing Sheets

FIG. 7A

MOVIE

| (1a) | (2) | (3) |
|---|---|---|
| wa1 (50%) | wa2 (40%) | wa3 (10%) |

FIG. 7B

CONCERT VIDEO

| (1b) | (2) | (3) |
|---|---|---|
| wb1 (30%) | wb2 (60%) | wb3 (10%) |

FIG. 7C

GAME

| (1a) | (2) |
|---|---|
| wc1 (30%) | wc2 (70%) |

PROCESSING APPARATUS AND IMMERSION LEVEL DERIVING METHOD

CROSS REFERENCE TO RELATED APPLICATION

This application claims the benefit of Japanese Priority Patent Application JP 2020-118638 filed Jul. 9, 2020, the entire contents of which are incorporated herein by reference.

BACKGROUND

The present disclosure relates to a technology for deriving an immersion level indicative of how much a user is immersed while viewing content.

A head-mounted display (HMD) worn on the head of a user provides the user with a virtual reality (VR) visual world. The HMD immerses the user in the visual world by presenting VR images to the user's entire field of view. Japanese Patent Laid-open No. 2017-117008 discloses an information processing apparatus that displays a menu screen including multiple icons to accept a user's operation to select an icon from the screen. According to Japanese Patent Laid-open No. 2017-117008, an icon arrangement part of the disclosed information processing apparatus arranges multiple icons in a virtual space in such a manner that the higher the priority of an icon, the closer the icon is positioned to the user.

SUMMARY

In this day and age flooded with multitudes of content, too many available options make it difficult for users to select content. Japanese Patent Laid-open No. 2017-117008 discloses techniques for positioning the icons of the content frequently selected by the user close to the user so that it is easy for the user to select any of these icons. According to this arrangement rule, however, the icons of yet-to-be-selected content are arranged to be far from the user who may find selecting these far-away icons bothersome. It is thus desired to come up with a new indicator for evaluating the attractiveness or the value of the content itself.

The present disclosure has been made in view of the above circumstances, and it is desirable to provide a technology for deriving an immersion level indicative of how much a user having experienced a virtual-reality visual world was immersed in that visual world, as an indicator for objective evaluation of content.

In solving the above problem and according to one mode of the present disclosure, there is provided a processing apparatus for deriving a level of immersion in content, the processing apparatus including a state data acquisition part configured to acquire state data including data indicative of a first reaction of a user during image display of the content and data indicative of a second reaction of the user different from the first reaction during the image display of the content; a first analysis part configured to analyze the data indicative of the first reaction so as to derive a first immersion evaluation value based on the first reaction of the user; a second analysis part configured to analyze the data indicative of the second reaction so as to derive a second immersion evaluation value based on the second reaction of the user; a weight setting part configured to set a weight value for each of the first and second immersion evaluation values; and an immersion level deriving part configured to derive the level of immersion in the content from the first and second immersion evaluation values and from the respective weight values thereof.

According to another mode of the present disclosure, there is provided an immersion level deriving method for deriving a level of immersion in content, the immersion level deriving method including acquiring data indicative of a first reaction of a user during image display of the content; analyzing the data indicative of the first reaction so as to derive a first immersion evaluation value based on the first reaction of the user; acquiring data indicative of a second reaction of the user during image display of the content; analyzing the data indicative of the second reaction so as to derive a second immersion evaluation value based on the second reaction of the user; setting a weight value for each of the first and second immersion evaluation values; and deriving the level of immersion in the content from the first and second immersion evaluation values and from the respective weight values thereof.

Incidentally, if other combinations of the above-outlined composing elements or the above expressions of the present disclosure are converted between different forms such as a method, an apparatus, a system, a computer program, a recording medium on which computer programs are readably recorded, and a data structure, they still constitute an effective embodiment of the present disclosure.

Thus, the present disclosure provides a technology for deriving an immersion level with respect to content.

BRIEF DESCRIPTION OF THE DRAWINGS

FIGS. 7A, 7B, and 7C are views depicting examples of weight values to be set.

DETAILED DESCRIPTION OF THE PREFERRED EMBODIMENT

Figure 1:
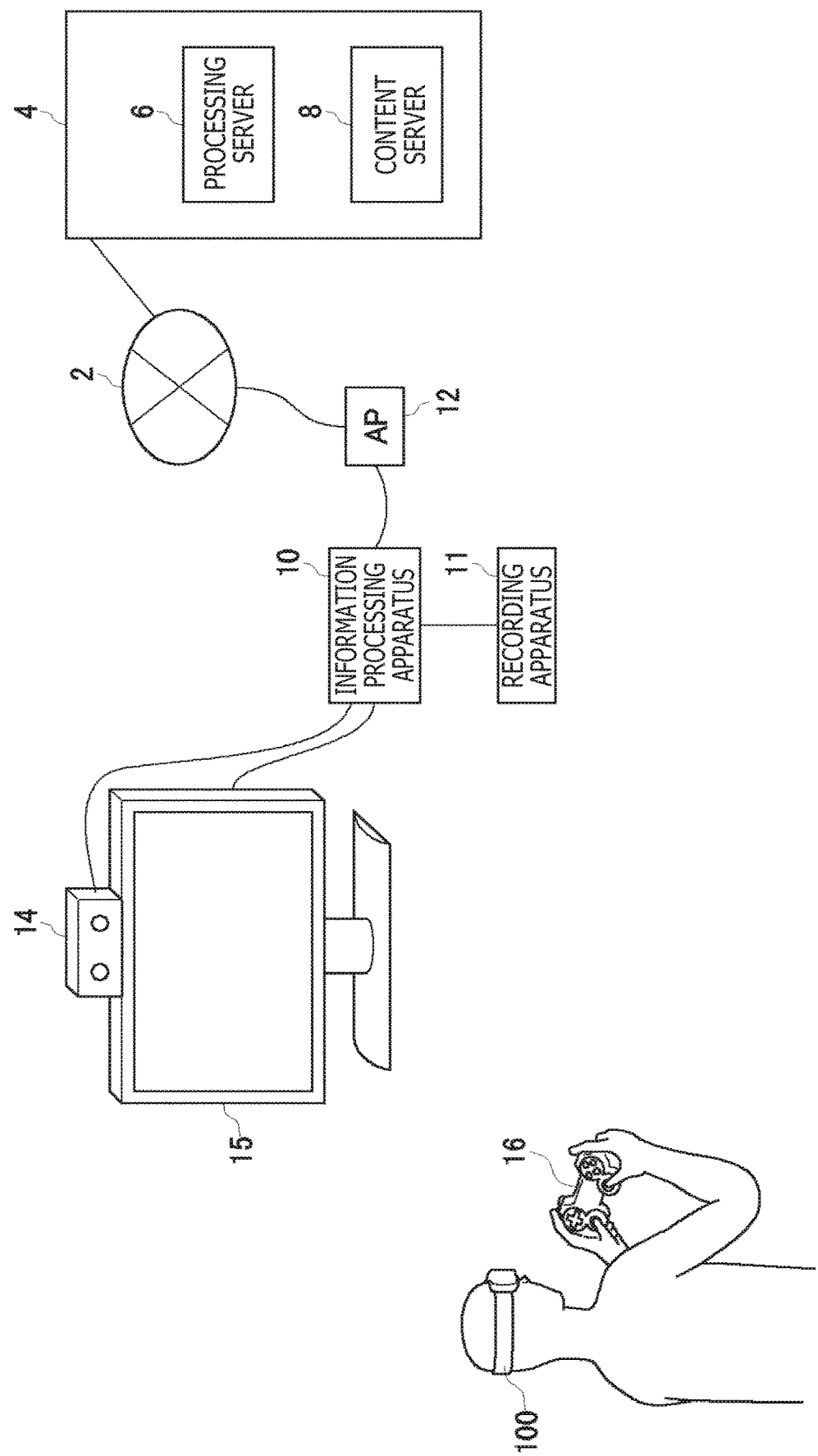
FIG. 1 is a view depicting a configuration example of an information processing system embodying the present disclosure.

FIG. 1 depicts a configuration example of an information processing system 1 embodying the present disclosure. The information processing system 1 includes an information processing apparatus 10, a head-mounted display (HMD) 100, a recording apparatus 11, an input apparatus 16 to be operated manually by a user, a camera 14 for capturing the user wearing the HMD 100, and an output apparatus 15 for displaying images. The output apparatus 15 may be a television set. The information processing apparatus 10 is connected with an external network 2 such as the Internet via an access point (AP) 12. The AP 12 having the functions of a wireless access point and of a router may be connected with the information processing apparatus 10 by cable or in a wireless manner according to a known wireless communication protocol.

The HMD 100 worn on the user's head provides the user with a VR visual world. When the information processing apparatus 10 is furnished with a head-tracking function to update field-of-view images displayed on the HMD 100 in keeping with the motion of the user's head, the user's sense of immersion in the visual world is that much enhanced.

The information processing apparatus 10 is a terminal apparatus that accepts operation data (e.g., key data) input to the input apparatus 16 by the user to thereby process diverse categories of content. The information processing apparatus 10 supplies the HMD 100 with image data and sound data resulting from the processing of content. For example, in the case where the content is a movie or a music video, the information processing apparatus 10 reproduces the content and causes the HMD 100 to output the images and sounds of the content. In the case where the content is game software, the information processing apparatus 10 executes the game software based on the user's operations and causes the HMD 100 to output the images and sounds of the game. The information processing apparatus 10 and the input apparatus 16 may be interconnected by cable or in a wireless manner according to a known wireless communication protocol. The information processing apparatus 10 and the HMD 100 may also be interconnected by cable or in a wireless manner according to a known wireless communication protocol.

The camera 14, which is a stereo camera, captures at predetermined intervals images of the user wearing the HMD 100 and supplies the captured images to the information processing apparatus 10. The HMD 100 is equipped with markers (tracking light emitting diodes (LEDs)) for tracking the user's head. The information processing apparatus 10 detects the motion of the HMD 100, based on the positions of the markers included in the captured images. The HMD 100 incorporates posture sensors (acceleration sensor and gyro sensor). By acquiring from the HMD 100 sensor data detected by the posture sensors, the information processing apparatus 10 performs a high-precision head tracking process while using the images captured of the markers as well. Diverse methods have been proposed so far regarding the tracking process. Any one of such methods may be adopted by the information processing apparatus 10 as long as the latter is able to detect the motion of the HMD 100. As will be discussed later, the HMD 100 of the present embodiment is equipped with a camera for capturing images of an external space. Given such images from the camera, the information processing apparatus 10 may carry out the head tracking process through simultaneous localization and mapping (SLAM).

Because the user views images on the HMD 100, the output apparatus 15 may not be indispensable for the user wearing the HMD 100. Still, setting up the output apparatus 15 allows other users not wearing the HMD 100 to view the image displayed on the output apparatus 15. The information processing apparatus 10 may let the output apparatus 15 either display the same image as the field-of-view image viewed by the user wearing the HMD 100 or display other images.

The HMD 100 is a display apparatus which, worn on the head of the user, displays images on display panels positioned in front of the user's eyes. The HMD 100 separately displays a left-eye image on a left-eye display panel and a right-eye image on a right-eye display panel. These images make up parallax images that produce a stereoscopic view when viewed by both eyes. Since the user views the display panels through optical lenses, the information processing apparatus 10 supplies the HMD 100 with parallax image data of which the lens-incurred optical distortion has been corrected.

The information processing apparatus 10 detects the position coordinates and the posture of the user head (HMD 100, in practice) through a user head tracking process. Here, the position coordinates of the HMD 100 may be coordinates in a three-dimensional space with its origin at a reference position. The position coordinates (latitude and longitude) of the reference position may be coordinates at the time the HMD 100 is switched on. The posture of the HMD 100 is expressed by inclinations in three-axis directions relative to a reference posture in the three-dimensional space. The reference posture is a posture in which the user's line-of-sight direction is in the horizontal direction. The reference posture may be set when the HMD 100 is switched on.

The information processing apparatus 10 is able to detect the position coordinates and the posture of the HMD 100 solely from the sensor data detected by the posture sensors of the HMD 100. By further analyzing images captured by the camera 14 of the markers (tracking LEDs) on the HMD 100, the information processing apparatus 10 can detect the position coordinates and the posture of the HMD 100 with high accuracy.

In the information processing system 1, multiple information processing apparatuses 10 are connected with a management server 4 via the network 2. The management server 4 includes a content server 8 and a processing server 6. The content server 8 delivers content to the information processing apparatuses 10. The processing server 6 derives the immersion levels of users with respect to the content provided by the content server 8. The processing server 6 and the content server 8 may be configured either as separate processing apparatuses or as an integrated processing apparatus.

From the multiple information processing apparatuses 10 operated by multiple users, the processing server 6 acquires state data indicative of the users' reactions during content image display, and derives therefrom the immersion levels of the users relative to the content. The "immersion level" is an indicator indicative of how much a user was immersed in the content. High immersion levels signify that the user was profoundly concentrated on the content. Low immersion levels mean that the user was not very concentrated on the content, i.e., the user did not view the content in a concentrated manner. The immersion level is derived by integrating the evaluation values of multiple parameters. For example, the immersion level may be expressed numerically on a scale of 100.

The processing server 6 derives the immersion levels of multiple users with respect to a given piece of content, and statistically processes the derived immersion levels of the multiple users. By so doing, the processing server 6 derives an immersion level serving as an objective indicator with respect to the content of interest. By use of the immersion levels with respect to pieces of content, the processing server 6 may generate a menu space in which a user may select the content. In the menu space constituted by a virtual space, multiple content icons are selectably arranged in such a manner that the higher the immersion level of content, the closer the icon of that content is positioned to the user.

The content server 8 delivers content to the information processing apparatus 10. The content server 8 may provide diverse categories of content such as movies, games, news videos, music videos, and concert videos.

Figure 2:
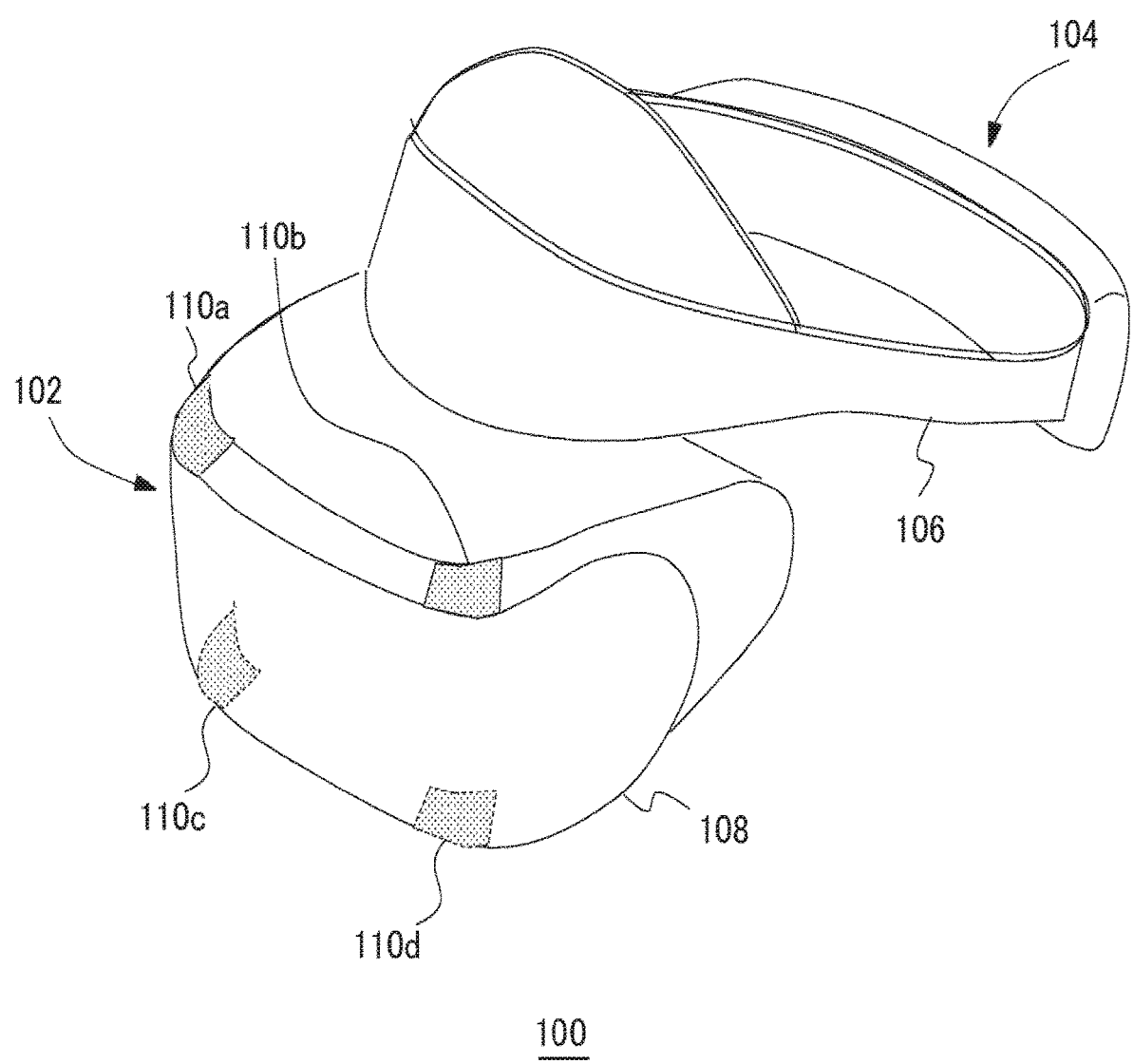
FIG. 2 is a view depicting a typical external appearance of the HMD.

FIG. 2 depicts a typical external appearance of the HMD 100. The HMD 100 includes an output mechanism part 102 and a wearing mechanism part 104. The wearing mechanism part 104 includes a wearing band 106 which, when worn around the user's head, secures the HMD 100 to the head.

The wearing band 106 may be formed of a material or have a structure such that the length of the wearing band 106 can be adjusted to the circumference of the user's head.

The output mechanism part 102 includes an enclosure 108 that covers both eyes when the HMD 100 is worn by the user. Inside the enclosure 108 are display panels directly facing the eyes when the HMD 100 is worn. The display panels may be liquid crystal display panels or organic electroluminescent (EL) panels. Also inside the enclosure 108 are a pair of right and left optical lenses positioned between the display panels and the user's eyes in a manner expanding the user's viewing angle. The HMD 100 may also include speakers or earphones positioned corresponding to the user's ears or provided with arrangements for connection with external headphones.

The external surface of the enclosure 108 is furnished with light-emitting markers 110a, 110b, 110c, and 110d. Whereas the light-emitting markers 110 in this example are constituted by tracking LEDs, other types of markers may be used instead. Any markers may be adopted as long as their image can be captured by the camera 14, so that the information processing apparatus 10 may analyze the captured image of the marker positions. There are no specific constraints on the number and the arrangement of the light-emitting markers 110. Still, the light-emitting markers 110 should be provided in sufficient numbers and in an appropriate manner of arrangement to detect the posture of the HMD 100. In the illustrated example, the light-emitting markers 110 are provided at the four corners of the front surface of the enclosure 108. More light-emitting markers 110 may be provided on the sides and the rear of the wearing band 106 so that images of the light-emitting markers 110 may also be captured by the camera 14 when the camera 14 is positioned behind the user.

The HMD 100 transmits to the information processing apparatus 10 the sensor data detected by the posture sensors, the image data captured by a camera (not depicted) imaging the outside of the enclosure, and the sound data input to a microphone. Upon receipt of the image data from the information processing apparatus 10, the HMD 100 displays images on the left-eye and right-eye display panels. Upon receiving the sound data from the information processing apparatus 10, the HMD 100 outputs sounds from the speakers.

Figure 3:
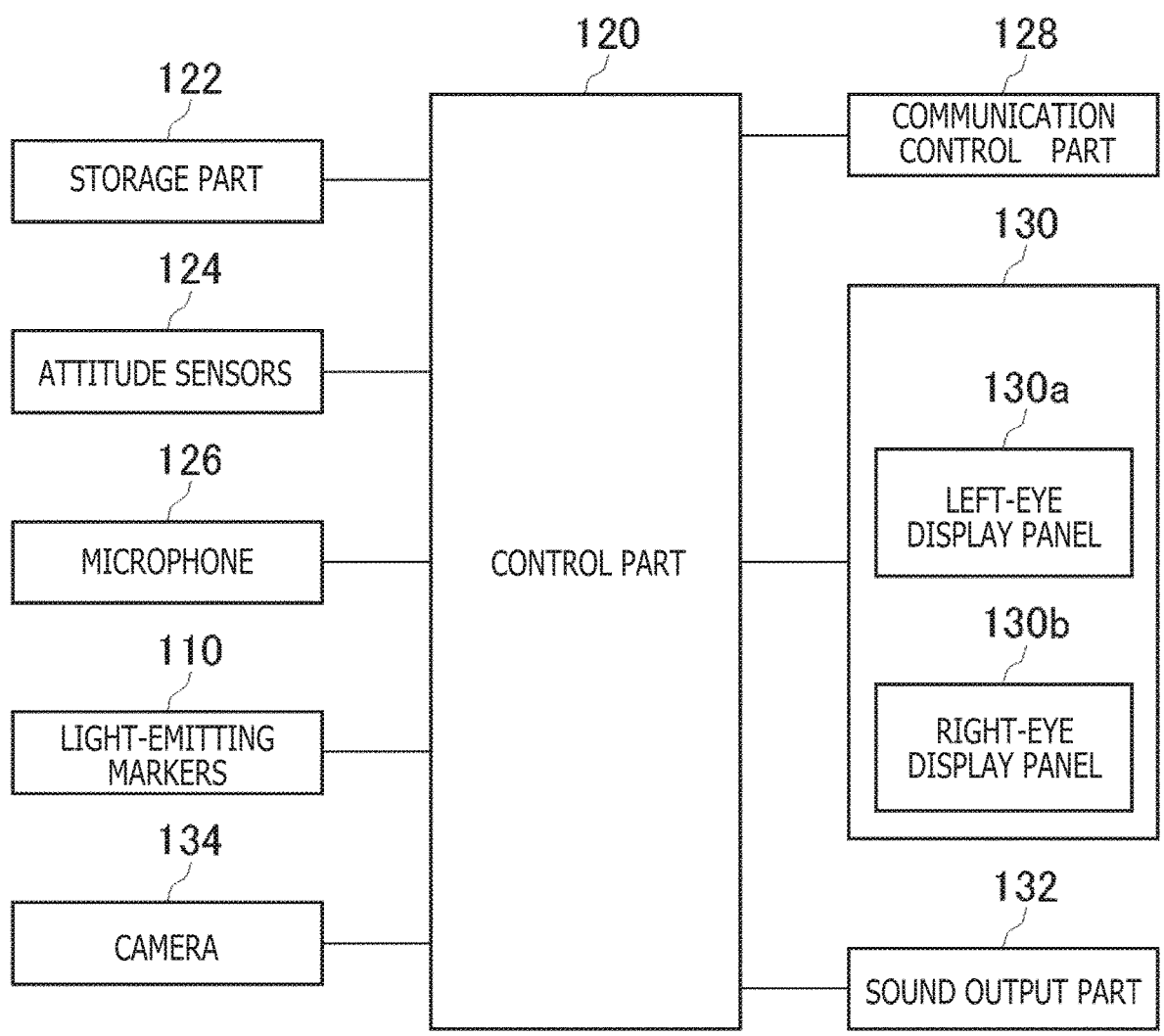
FIG. 3 is a diagram depicting functional blocks of the HMD.

FIG. 3 depicts functional blocks of the HMD 100. A control part 120 is a main processor that processes and outputs various kinds of data such as image data, sound data, and sensor data as well as instructions. A storage part 122 temporarily stores the data and instructions processed by the control part 120. Posture sensors 124 detect posture information regarding the HMD 100. The posture sensors 124 include at least a three-axis acceleration sensor and a three-axis gyro sensor. A camera 134 attached to the outer surface of the enclosure 108 captures images of the space external to the HMD 100.

A communication control part 128 causes the data output from the control part 120 to be transmitted to an external information processing apparatus 10 in a wired or wireless manner via a network adaptor or an antenna. Also, the communication control part 128 receives data from the information processing apparatus 10 in a wired or wireless manner via a network adaptor or an antenna, before outputting the received data to the control part 120.

The control part 120 supplies a display panel 130 with the image data of content received from the information processing apparatus 10 for image display, and supplies a sound output part 132 with the sound data of content received from the information processing apparatus 10 for sound output. The display panel 130 includes a left-eye display panel 130a and a right-eye display panel 130b, each of which displays a pair of parallax images. Also, the control part 120 causes the communication control part 128 to transmit the sensor data from the posture sensors 124, the sound data from a microphone 126, and the captured image data from the camera 134 to the information processing apparatus 10.

Figure 4:
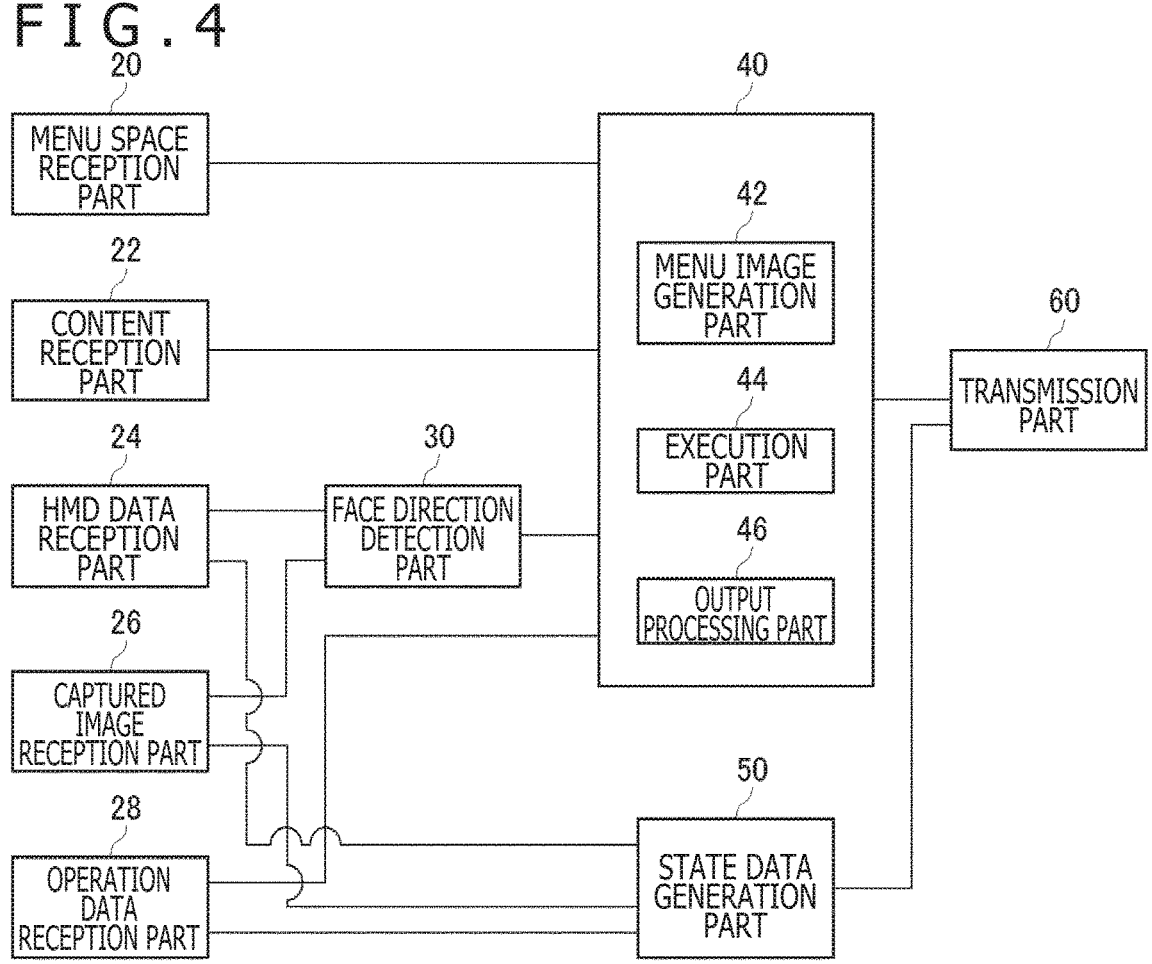
FIG. 4 is a diagram depicting functional blocks of an information processing apparatus.

FIG. 4 depicts functional blocks of the information processing apparatus 10. The information processing apparatus 10 includes a menu space reception part 20, a content reception part 22, an HMD data reception part 24, a captured image reception part 26, an operation data reception part 28, and a transmission part 60 as an input/output interface with the outside. The information processing apparatus 10 further includes a face direction detection part 30, a content processing part 40, and a state data generation part 50. The content processing part 40 includes a menu image generation part 42, an execution part 44, and an output processing part 46.

The elements depicted as the functional blocks in FIG. 4 for performing diverse processes may be configured either in hardware such as circuit blocks, memories, and other large-scale integrated circuits (LSIs), or in software such as programs loaded in memories. Thus, it will be understood by those skilled in the art that these functional blocks may be implemented in hardware alone, in software alone, or by a combination of both in diverse forms and are not limited to any of such forms.

In the embodiment, the processing server 6 generates data (menu space data) for constituting a menu space in which the user selects content, and supplies the generated data to the information processing apparatus 10. In the information processing apparatus 10, the menu space reception part 20 receives the menu space data, and the menu image generation part 42 generates a menu image based on the face direction of the user. The transmission part 60 transfers the generated menu image to the HMD 100.

Figure 5:
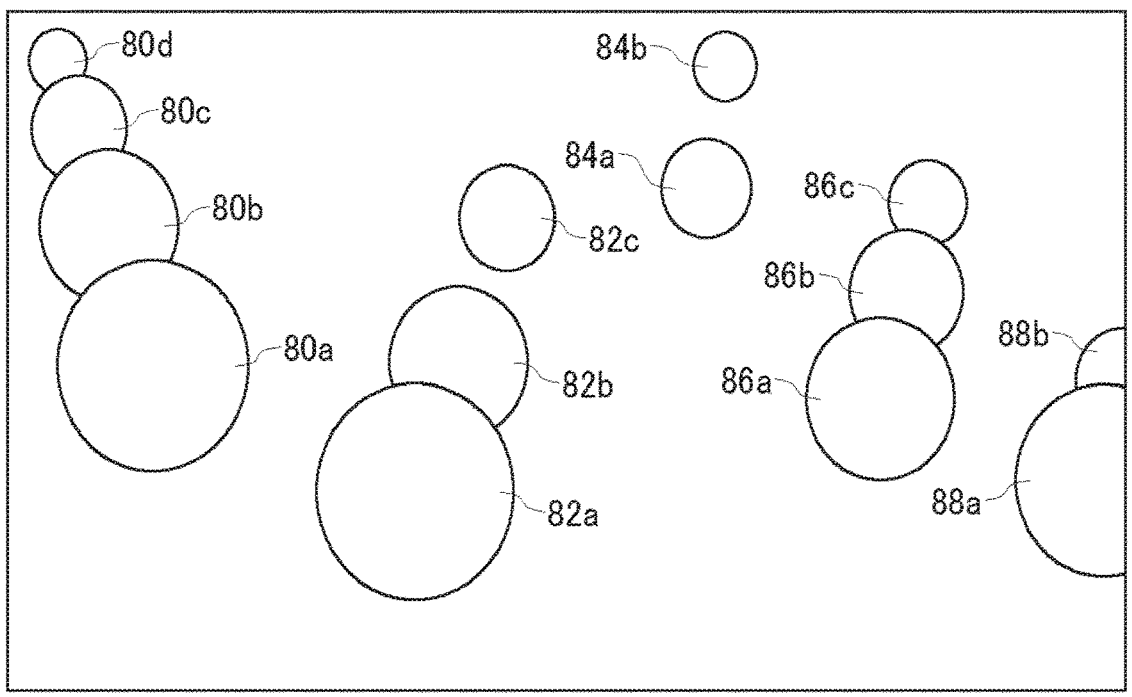
FIG. 5 is a view depicting a menu screen displayed on a display panel of the HMD.

FIG. 5 depicts a menu screen displayed on the display panel 130 of the HMD 100. Multiple icons of content are displayed on the menu screen. The multiple content icons are arranged in such a manner that the higher the derived immersion level for the content, the closer the icon of that content is positioned to the user. In this menu screen example, the multiple content icons are arrayed in a row for each different category.

Movie icons 80a, 80b, 80c, and 80d represent movie content. The higher the immersion level for movie content, the closer the icon of that movie content is positioned to the user and the larger the movie content icon is displayed. Game icons 82a, 82b, and 82c represent game content. The higher the immersion level for game content, the closer the icon of that game content is positioned to the user and the larger the game content icon is displayed. News video icons 84a and 84b represent news video content. Music video icons 86a, 86b, and 86c represent music video content. Concert video icons 88a and 88b represent music concert video content. In each of these categories, the higher the immersion level for content, the closer the icon of that content may be positioned to the user and the larger the content icon may be displayed.

Preferably, the icons of the content having high immersion levels may be displayed in an eye-catching manner. For example, the higher the immersion level of content, the more conspicuously deformed or the more prominently pulsated the displayed icon of that content may be.

The operation data reception part 28 receives from the input apparatus 16 the operation data input by the user. The operation data reception part 28 supplies the data representing the user's operations to the content processing part 40 and to the state data generation part 50.

The HMD data reception part 24 receives the sensor data detected by the posture sensors 124 of the HMD 100, the sound data acquired by the microphone 126, and the captured image data acquired by the camera 134. The HMD data reception part 24 supplies the sensor data, the sound data, and the captured image data to the state data generation part 50 and feeds the sensor data to the face direction detection part 30.

The captured image reception part 26 receives images captured by the camera 14 of the user at predetermined intervals, and supplies the received images to the face direction detection part 30 and to the state data generation part 50. The camera 14 may capture images of the space around the user at intervals of 1/60 seconds.

The face direction detection part 30 acquires the sensor data from the posture sensors 124 and the captured images from the camera 14 as posture information indicative of the posture of the HMD 100 worn on the user's head, thereby detecting the face direction of the user. Specifically, the face direction detection part 30 detects changes in the posture of the HMD 100, based on the sensor data from the three-axis gyro sensor among the posture sensors 124. Preferably, the face direction detection part 30 may increase the accuracy of detecting changes in the posture by making additional use of the result of image capture by the light-emitting markers 110 for tracking purposes. The face direction detection part 30 determines the posture thus identified of the HMD 100 as the user's face direction and provides the content processing part 40 with the determined face direction.

In the content processing part 40, the menu image generation part 42 uses the face direction supplied from the face direction detection part 30, as information for determining the optical axis direction of a virtual camera in the menu space. The menu image generation part 42 may alternatively use the operation data received by the operation data reception part 28, as the information for determining the optical axis direction of the virtual camera. In the embodiment, the position of the virtual camera in the menu space is assumed to be fixed. Alternatively, the virtual camera may be arranged to be movable in the menu space. The menu image generation part 42 generates the menu image in a manner reflecting the position and the optical axis direction of the virtual camera. When the menu image generation part 42 generates a left-eye menu image and a right-eye menu image, the output processing part 46 causes the transmission part 60 to transmit the left-eye menu image and the right-eye menu image to the HMD 100. Given the transmission, the HMD 100 causes the display panel 130 to display the menu screen depicted in FIG. 5.

The user may select content icons included in the menu screen by operating the input apparatus 16. In the case where multiple content icons overlap with each other on the menu screen, the user may move or erase one of the overlapping icons with a hand swipe or by voice. Alternatively, the user may move one of the overlapping icons by tilting the head. In this manner, the user may bring about a state in which a desired content icon is selected easily, before making the selection. When the user selects the desired content icon, the HMD 100 transmits the selected content information to the information processing apparatus 10. In turn, the information processing apparatus 10 transmits the content information to the content server 8. Upon receipt of the content information selected by the user, the content server 8 transmits the content of interest to the information processing apparatus 10.

In the information processing apparatus 10, the content reception part 22 receives the content. The execution part 44 processes the received content, according to the operation data received by the operation data reception part 28 from the input apparatus 16 and/or in keeping with the user's face direction detected by the face direction detection part 30. The output processing part 46 causes the transmission part 60 to transmit the image data and sound data resulting from the processing of the content to the HMD 100. In turn, the HMD 100 causes the display panel 130 to display content images and the sound output part 132 to output content sounds. This is how the user can enjoy the selected content.

As described above, the HMD data reception part 24 supplies the state data generation part 50 with the sensor data detected by the posture sensors 124, with the sound data acquired by the microphone 126, and with the captured image data obtained by the camera 134. The captured image reception part 26 supplies the state data generation part 50 with the captured image data acquired by the camera 14. Further, the operation data reception part 28 supplies the state data generation part 50 with the operation data input through the input apparatus 16 by the user. The output processing part 46 provides the state data generation part 50 with information indicating whether or not a content image is displayed on the display panel 130.

During content image display on the display panel 130, the state data generation part 50 transmits to the processing server 6 various kinds of data supplied from the HMD data reception part 24, from the captured image reception part 26, and from the operation data reception part 28 collectively, as state data indicative of the state in which the user is reacting to the content. The state data generation part 50 is not required to transmit the state data in real time. The state data generation part 50 may gather the various kinds of data supplied during content image display and, at the end of content image display, transmit the gathered pieces of data collectively to the processing server 6.

Explained below are the processes performed by the processing server 6 for deriving the immersion level of the user with respect to content from the user state data transmitted from the information processing apparatus 10.

Figure 6:
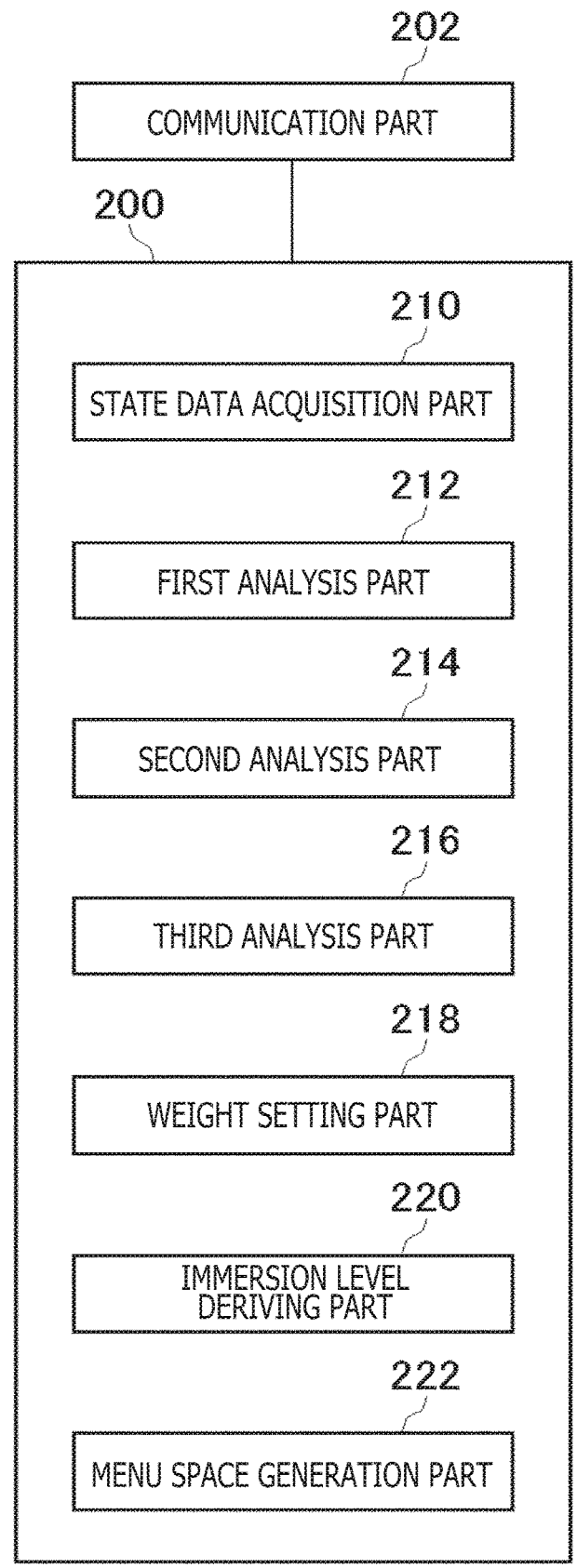
FIG. 6 is a diagram depicting functional blocks of a processing server.

FIG. 6 depicts functional blocks of the processing server 6. The processing server 6 includes a processing part 200 and a communication part 202. The processing part 200 includes a state data acquisition part 210, a first analysis part 212, a second analysis part 214, a third analysis part 216, a weight setting part 218, an immersion level deriving part 220, and a menu space generation part 222.

The elements depicted as the functional blocks in FIG. 6 for performing diverse processes may be configured either in hardware such as circuit blocks, memories, and other LSIs, or in software such as programs loaded in memories. Thus, it will be understood by those skilled in the art that these functional blocks may be implemented in hardware alone, in software alone, or by a combination of both in diverse forms and are not limited to any of such forms.

The state data acquisition part 210 acquires from the information processing apparatus 10 via the communication part 202 the state data indicative of the state in which the user reacts during content image display. The pieces of data included in the state data and indicative of the user's reactions are categorized into the following data types:

Data Indicative of a First Reaction

The data indicative of a first reaction is motion data representing the user's body motion during content image display. This type of data includes the sensor data detected by the posture sensors 124, the captured image data acquired by the camera 134, and the captured image data obtained by the camera 14.

Data Indicative of a Second Reaction

The data indicative of a second reaction is sound data representing the voice uttered by the user during content image display. The sound data acquired by the microphone 126 corresponds to this type of data.

Data Indicative of a Third Reaction

The data indicative of a third reaction is operation data representing the operations performed by the user on the input apparatus 16 during content image display. The operation data input to the input apparatus 16 corresponds to this type of data.

The processing part 200 analyzes the data of each data type to derive an evaluation value per data type so as to acquire the immersion level of the user with respect to content.

(1) First Immersion Evaluation Value Based on the User's First Reaction

The first analysis part 212 analyzes the operation data indicative of the first reaction so as to derive a first immersion evaluation value based on the user's body motion. Whereas the operation data includes the sensor data obtained by the posture sensors 124 and the captured image data acquired by the cameras 134 and 14 in the present embodiment, the first analysis part 212 may identify the user's body motion by using at least one suitable type of data. The first analysis part 212 derives the first immersion evaluation value based on the user's body motion according to one of the following two evaluation criteria.

(1a) First Evaluation Criterion Based on Motionless Posture

When the user is immersed in such content as a movie or a news video, the user is not very active and remains more or less motionless. Thu, according to the first evaluation criterion, the first analysis part 212 evaluates the user's motionless posture as a state in which the user is immersed in the content. During content display, the first analysis part 212 measures the time in which the user's posture is continuously motionless, and acquires the ratio of the time of motionless posture with respect to the content display time. At this point, if the time of being continuously motionless is shorter than a predetermined time period (e.g., 30 seconds), that time is not added to the motionless posture time. The first analysis part 212 derives the first immersion evaluation value in keeping with the acquired ratio. The first immersion evaluation value is derived numerically on a scale of 100.

In the case where the ratio of the motionless posture time relative to the content display time is 90% or more, the first analysis part 212 may set the first immersion evaluation value to 100. For example, when the content display time is 100 minutes and the accumulated time of motionless posture is at least 90 minutes, the first analysis part 212 sets the first immersion evaluation value to 100. In the case where the ratio is 70% or more but less than 90%, the first analysis part 212 sets the first immersion evaluation value to 60. Where the ratio is 50% or more but less than 70%, the first analysis part 212 sets the first immersion evaluation value to 30. Where the ratio is less than 50%, the first analysis part 212 may set the first immersion evaluation value to zero. In this manner, the first analysis part 212 may derive the first immersion evaluation value according to the first evaluation criterion based on motionless posture time.

(1b) Second Evaluation Criterion Based on Continuous Motion

When the user is immersed in such content as a music video or a concert video, the user moves his or her body in rhythm to the music. Thus, according to the second evaluation criterion, the first analysis part 212 evaluates the state in which the user is continuously moving his or her body as a state in which the user is immersed in the content. During content display, the first analysis part 212 measures the time in which the user's posture is continuously moving, and obtains the ratio of the time of continuous motion with respect to the content display time. At this point, if the continuous motion time is shorter than a predetermined time period (e.g., 20 seconds), the time is not added to the continuous motion time. The first analysis part 212 derives the first immersion evaluation time in keeping with the ratio. The first immersion evaluation value is derived numerically on a scale of 100.

In the case where the ratio of the continuous motion time relative to the content display time is 50% or more, the first analysis part 212 may set the first immersion evaluation value to 100. For example, when the content display time is 100 minutes and the accumulated time of continuous motion is at least 50 minutes, the first analysis part 212 sets the first immersion evaluation value to 100. In the case where the ratio is 30% or more but less than 50%, the first analysis part 212 sets the first immersion evaluation value to 60. Where the ratio is 10% or more but less than 30%, the first analysis part 212 sets the first immersion evaluation value to 30. Where the ratio is less than 10%, the first analysis part 212 may set the first immersion evaluation value to zero. In this manner, the first analysis part 212 may derive the first immersion evaluation value according to the second evaluation criterion based on the time of continuous motion.

The first analysis part 212 determines which evaluation criterion to use, on the basis of the content categories. In the case where the content is a movie, a news video, or a game, for example, the first analysis part 212 uses the first evaluation criterion based on the time of continuous motionlessness. On the other hand, where the content is a music video or a concert video, for example, the first analysis part 212 uses the second evaluation criterion based on the time of continuous motion. When the evaluation criteria are selectively used according to category, the first analysis part 212 can suitably derive the first immersion evaluation value on the basis of the user's body motion.

(2) Second Immersion Evaluation Value Based on the User's Second Reaction

The second analysis part 214 analyzes the sound data indicative of the second reaction so as to derive a second immersion evaluation value based on the user's uttered voice. Whereas the sound data in the present embodiment is acquired by the microphone 126 of the HMD 100, the sound data may also be obtained by another microphone set up in the space around the user.

In the State where the User is Able to Converse with Another User

In the state where the user can converse with another user while they are viewing the same content, the conversation with the other user enhances the user's concentration and makes the user easily immerse in the content. Thus, the second analysis part 214 measures the time in which the user utters voice during content display, and obtains the ratio of the time of vocal utterance with respect to the content display time.

In the case where the ratio of the vocal utterance time relative to the content display time is 10% or more, the second analysis part 214 may set the second immersion evaluation value to 100. For example, when the content display time is 100 minutes and the accumulated time of vocal utterance is at least 10 minutes, the second analysis part 214 sets the second immersion evaluation value to 100. In the case where the ratio is 5% or more but less than 10%, the second analysis part 214 sets the second immersion evaluation value to 60. Where the ratio is 2% or more but less than 5%, the second analysis part 214 sets the second immersion evaluation value to 30. Where the ratio is less than 2%, the second analysis part 214 may set the second immersion evaluation value to zero. In this manner, the second analysis part 214 may derive the second immersion evaluation value based on the time of vocal utterance.

In the State where the User is Unable to Converse with Another User

Muttering to oneself is known to have an effect of being able to concentrate on the matter before the eyes. For this reason, if the user is murmuring aloud while watching the content alone, there is a high possibility that the user is immersed in the content. Thus, the second analysis part 214 measures the time in which the user is uttering voice (murmuring aloud) during content display, and obtains the ratio of the time of vocal utterance with respect to the content display time.

In the case where the ratio of the vocal utterance time relative to the content display time is at least 5%, the second analysis part 214 may set the second immersion evaluation value to 100. For example, when the content display time is 100 minutes and the accumulated time of vocal utterance is at least 5 minutes, the second analysis part 214 sets the second immersion evaluation value to 100. In the case where the ratio is 3% or more but less than 5%, the second analysis part 214 sets the second immersion evaluation value to 60. Where the ratio is 1% or more but less than 3%, the second analysis part 214 sets the second immersion evaluation value to 30. Where the ratio is less than 1%, the second analysis part 214 may set the second immersion evaluation value to zero. In this manner, the second analysis part 214 may derive the second immersion evaluation value based on the time of solitary vocal utterance.

During display of music content such as a concert video or a music video, the user in a state of immersion may sing along to the singing voice reproduced as content sound. Thus, in the case of the content in which music plays, the second analysis part 214 derives the second immersion evaluation value according to the following criterion.

In the case where the ratio of the time of vocal utterance to the content display time is 40% or more, the second analysis part 214 may set the second immersion evaluation value to 100. For example, when the content display time is 100 minutes and the accumulated time of utterance of singing voice is at least 40 minutes, the second analysis part 214 sets the second immersion evaluation value to 100. In the case where the ratio is 20% or more but less than 40%, the second analysis part 214 sets the second immersion evaluation value to 60. Where the ratio is 10% or more but less than 20%, the second analysis part 214 sets the second immersion evaluation value to 30. Where the ratio is less than 10%, the second analysis part 214 may set the second immersion evaluation value to zero. In this manner, the second analysis part 214 may derive the second immersion evaluation value based on the time of the user's utterance of singing voice.

(3) Third Immersion Evaluation Value Based on the User's Third Reaction

The third analysis part 216 analyzes the operation data regarding the input apparatus 16, the data being indicative of the third reaction, so as to derive a third immersion evaluation value based on the operating state of the input apparatus 16.

During display of the content as a movie, a news video, a music video, or a concert video, the input apparatus 16 is used to perform operations to display menus for image switchover, to change sound volume, or to fast-forward or fast-backward, for example. It follows that, if the input apparatus 16 is frequently operated during display of the content, that means the user is not immersed in the content. Thus, during content display, the third analysis part 216 counts the number of times the input apparatus 16 is operated, to obtain the number of operations per unit time. For example, the third analysis part 216 may obtain the number of operations for every 10 minutes. The third analysis part 216 derives the third immersion evaluation value according to the number of operations per unit time. The third immersion evaluation value is derived numerically on a scale of 100.

In the case where the number of operations per unit time (for every 10 minutes) is at least 2, the third analysis part 216 may set the third immersion evaluation value to zero. Where the number of operations is 1 or more but fewer than 2, the third analysis part 216 sets the third immersion evaluation value to 30. Where the number of operations is 0.5 or more but fewer than 1, the third analysis part 216 sets the third immersion evaluation value to 50. Where the number of operations is fewer than 0.5, the third analysis part 216 sets the third immersion evaluation value to 100.

Incidentally, during game content display, the user causes the game to progress by operating the input apparatus 16. For this reason, during display of game content (i.e., while the user is playing a game), the operation data regarding the input apparatus 16 is what is needed to let the game progress and does not represent the user's level of immersion in the game content. In the case of game content, it is thus necessary to ignore the third immersion evaluation value in deriving the immersion level.

As described above, the first analysis part 212 derives the first immersion evaluation value, the second analysis part 214 derives the second immersion evaluation value, and the third analysis part 216 derives the third immersion evaluation value. The weight setting part 218 sets weight values for each of the first, second, and third immersion evaluation values. The immersion level deriving part 220 derives the level of immersion in the content from the first, second, and third immersion evaluation values and from their respective weight values. The weight setting part 218 may set the weight values corresponding to each content category.

FIGS. 7A to 7C depict examples of the weight values set for each category.

FIG. 7A depicts typical weight values for movie content. The weight setting part 218 sets the weight value of the first immersion evaluation value to wa1 (50%), the weight value of the second immersion evaluation value to wa2 (40%), and the weight value of the third immersion evaluation value to wa3 (10%) under the first evaluation criterion. The sum of the weight values wa1, wa2, and wa3 amounts to 100%. In the case of movie content, the first immersion evaluation value is set as the parameter most influential on the level of immersion in the content.

The immersion level deriving part 220 derives the level of immersion in movie content as follows:

(Immersion level)=first immersion evaluation value×
  $wa1$+second immersion evaluation value×$wa2$+
  third immersion evaluation value×$wa3$ The operations to multiply the immersion evaluation values by their weight values correspond to the process of weighting the immersion evaluation values. The above expression is used to derive one user's level of immersion in movie content.

FIG. 7B depicts typical weight values for concert video content. The weight setting part 218 sets the weight value of the first immersion evaluation value to wb1 (30%), the weight value of the second immersion evaluation value to wb2 (60%), and the weight value of the third immersion evaluation value to wb3 (10%) under the second evaluation criterion. The sum of the weight values wb1, wb2, and wb3 amounts to 100%. In the case of concert video content, the second immersion evaluation value is set as the parameter most influential on the level of immersion in the content.

The immersion level deriving part 220 derives the level of immersion in concert video content as follows:

(Immersion level)=first immersion evaluation value×
  $wb1$+second immersion evaluation value×$wb2$+
  third immersion evaluation value×$wb3$ The above expression is used to derive one user's level of immersion in concert video content. FIG. 7C depicts typical weight values for game content. The weight setting part 218 sets the weight value of the first immersion evaluation value to wc1 (30%), the weight value of the second immersion evaluation value to wc2 (70%), and the weight value of the third immersion evaluation value to 0% under the first evaluation criterion. The sum of the weight values wc1 and wc2 amounts to 100%. In the case of game content, the second immersion evaluation value is set as the parameter most influential on the level of immersion in the content.

The immersion level deriving part 220 derives the level of immersion in game content as follows:

(Immersion level)=first immersion evaluation value×
  $wc1$+second immersion evaluation value×$wc2$ The above expression is used to derive one user's level of immersion in game content. Because the user operates the input apparatus 16 during execution of game content, the operating state of the input apparatus 16 is not used as a parameter for deriving the immersion level. This contributes to improving the reliability of the immersion level to be derived.

Given a single piece of content, the immersion level deriving part 220 derives the immersion levels of multiple users and statistically processes the immersion levels thus obtained, in order to derive the immersion level of the content in question as an objective evaluation indicator thereof. As a simple example of statistical processing, the immersion level deriving part 220 may calculate an average of the immersion levels of multiple users to derive the immersion level for the content of interest. The weight setting part 218 sets weight values for each different category, and the immersion level deriving part 220 calculates the immersion levels by weighting the immersion evaluation values with use of the calculated weight values. This makes it possible to rank the pieces of content by immersion level in each category.

The menu space generation part 222 generates a menu space in which the user selects content, by taking advantage of the immersion levels derived by the immersion level deriving part 220 regarding the content. In the menu space, as depicted in FIG. 5, the higher the immersion level for content, the closer the icon of the content is arranged to the virtual user position and the larger the content icon is displayed. This allows the user to easily select pieces of content with higher levels of immersion in a given category.

Preferably, the immersion level deriving part 220 may modify immersion levels in such a manner as to facilitate comparisons of immersion level-related indicators between categories. For example, the immersion level deriving part 220 may acquire deviation values of the immersion levels within each category. Because the deviation values of the immersion levels obtained in a given category are indicators of the amounts of deviation from averages, the deviation values may be used for the comparisons between categories. In this case, the menu space generation part 222 may generate a menu space in which content is to be selected, by using the deviation values of immersion levels independently of the categories.

The present disclosure has been described above in conjunction with a specific embodiment. It is to be understood by those skilled in the art that suitable combinations of the constituent elements and of various processes of the embodiment described above as examples will lead to further variations of the present disclosure and that such variations also fall within the scope of the present disclosure.

It has been explained above that the information processing apparatus 10 and the HMD 100 are separate entities in the embodiment. Alternatively, the functions of the information processing apparatus 10 may be incorporated in the HMD 100, and the HMD 100 alone may implement the function of state data transmission.

In the above embodiment, the immersion level deriving part 220 derives the level of immersion in content by using three parameters, i.e., the first, second, and third immersion evaluation values. Alternatively, any two of the three parameters may be used to derive the content immersion level. The immersion level deriving part 220 may also derive the content immersion level, based on a combination of the first and second immersion evaluation values, on a combination of the first and third immersion evaluation values, or on a combination of the second and third immersion valuation values.

What is claimed is:

1. A processing apparatus for deriving a level of immersion in content, the processing apparatus comprising:
  a state data acquisition circuit configured to acquire state data including data indicative of a first reaction of a user during image display of the content and data indicative of a second reaction of the user different from the first reaction during the image display of the content;
  a first analysis circuit configured to analyze the data indicative of the first reaction so as to derive a first immersion evaluation value based on the first reaction of the user;
  a second analysis circuit configured to analyze the data indicative of the second reaction so as to derive a second immersion evaluation value based on the second reaction of the user;
  a weight setting circuit configured to set a weight value for each of the first and second immersion evaluation values; and
  an immersion level deriving circuit configured to derive the level of immersion in the content from the first and second immersion evaluation values and from the respective weight values of the first and second immersion evaluation values, wherein the data indicative of a third reaction of the user is operation data representing only one or more operations performed by the user on an input apparatus during image display of the content, where the one or more operations performed by the user operate to change at least one of the image display of the content and audio data of the content without directly inputting the third reaction of the user beyond the operation data representing the one or more operations performed on the input apparatus.

2. The processing apparatus according to claim 1, wherein the data indicative of the first reaction of the user is motion data representing a motion of the user, and the data indicative of the second reaction of the user is sound data representing a voice uttered by the user.

3. The processing apparatus according to claim 1, wherein the state data acquisition circuit acquires the state data including data indicative of the third reaction of the user during the image display of the content, the processing apparatus further includes a third analysis circuit configured to analyze the data indicative of the third reaction so as to derive a third immersion evaluation value based on the third reaction of the user, the weight setting circuit sets a weight value for the third immersion evaluation value, and the immersion level deriving circuit derives the level of immersion in the content from the first, second, and third immersion evaluation values weighted respectively by the weight values of the first, second, and third immersion evaluation values.

4. The processing apparatus according to claim 1, wherein the weight setting circuit sets a weight value corresponding to a category of the content.

5. An immersion level deriving method for deriving a level of immersion in content, the immersion level deriving method comprising:

acquiring data indicative of a first reaction of a user during image display of the content;

analyzing the data indicative of the first reaction so as to derive a first immersion evaluation value based on the first reaction of the user;

acquiring data indicative of a second reaction of the user during the image display of the content;

analyzing the data indicative of the second reaction so as to derive a second immersion evaluation value based on the second reaction of the user;

setting a weight value for each of the first and second immersion evaluation values; and deriving the level of immersion in the content from the first and second immersion evaluation values and from the respective weight values of the first and second immersion evaluation values, wherein the data indicative of a third reaction of the user is operation data representing only one or more operations performed by the user on an input apparatus during image display of the content, where the one or more operations performed by the user operate to change at least one of the image display of the content and audio data of the content without directly inputting the third reaction of the user beyond the operation data representing the one or more operations performed on the input apparatus.

6. A non-transitory, computer readable storage medium containing a computer program, which when executed by a computer, causes the computer to perform an immersion level deriving method for deriving a level of immersion in content by carrying out actions, comprising:

acquiring data indicative of a first reaction of a user during image display of content;

analyzing the data indicative of the first reaction so as to derive a first immersion evaluation value based on the first reaction of the user;

acquiring data indicative of a second reaction of the user during the image display of the content;

analyzing the data indicative of the second reaction so as to derive a second immersion evaluation value based on the second reaction of the user;

setting a weight value for each of the first and second immersion evaluation values; and deriving a level of immersion in the content from the first and second immersion evaluation values and from the respective weight values of the first and second immersion evaluation values, wherein the data indicative of a third reaction of the user is operation data representing only one or more operations performed by the user on an input apparatus during image display of the content, where the one or more operations performed by the user operate to change at least one of the image display of the content and audio data of the content without directly inputting the third reaction of the user beyond the operation data representing the one or more operations performed on the input apparatus.

7. The processing apparatus according to claim 1, wherein, when the content is not gaming content resulting from the user manipulating gameplay during execution of a game application through the input apparatus, the data of at least one of the first and second reactions is the operation data representing one or more of a plurality of operations performed by the user on the input apparatus.

8. The processing apparatus according to claim 1, wherein, when the content is gaming content resulting from the user manipulating gameplay during execution of a game application through the input apparatus, none of the data of any of the first and second reactions is taken from the operation data resulting from the user via the input apparatus.

9. The processing apparatus according to claim 1, wherein, when the content is not gaming content resulting from the user manipulating gameplay during execution of a game application through the input apparatus, the data of at least one of the first and second reactions is one or more of the plurality of operations performed by the user on the input apparatus, which includes at least one of operations to display menus for image switchover, to change sound volume, or fast-forward the content, and to fast-backward the content.

10. The processing apparatus according to claim 1, wherein the analysis includes counting a number of times that the input apparatus is operated by the user per unit time and deriving an immersion evaluation value according to such number of operations per unit time.

* * * * *